United States Patent [19]

Doddema et al.

[11] Patent Number: 5,667,690
[45] Date of Patent: Sep. 16, 1997

[54] PROCESS FOR REMOVING NOXIOUS COMPOUNDS

[75] Inventors: Harmannus Johannes Doddema, Delft; Arie Cornelis Besemer, Amerongen; Marinus Pieter Harkes, Rotterdam, all of Netherlands

[73] Assignee: Nederlandse Organisatie voor Toegepast - Natuurwetenschappelijk, Netherlands

[21] Appl. No.: 620,214

[22] Filed: Mar. 22, 1996

[30] Foreign Application Priority Data

Mar. 22, 1995 [NL] Netherlands ............... 9500551

[51] Int. Cl.$^6$ ........................................ C02F 1/72
[52] U.S. Cl. ............... 210/631; 210/747; 210/759; 210/908; 210/909; 210/763
[58] Field of Search ................... 210/759, 747, 210/631, 908, 909, 763

[56] References Cited

U.S. PATENT DOCUMENTS

| | | | |
|---|---|---|---|
| 4,370,241 | 1/1983 | Junkermann et al. | 210/759 |
| 4,591,443 | 5/1986 | Brown et al. | 210/759 |
| 4,749,491 | 6/1988 | Lawes et al. | 210/759 |
| 5,273,663 | 12/1993 | Kurek et al. | 210/759 |
| 5,376,285 | 12/1994 | Kurek et al. | 210/759 |

FOREIGN PATENT DOCUMENTS

| | | |
|---|---|---|
| 0 590 711 A1 | 4/1994 | European Pat. Off. |
| 27 03 267 A1 | 8/1978 | Germany |

OTHER PUBLICATIONS

Derwent Publication, Appln. No. 94–039787 Japan.
Derwent Publication, Appln. No. 78–01130A Japan.

*Primary Examiner*—Neil McCarthy
*Attorney, Agent, or Firm*—Cushman Darby & Cushman Intellectual Property Group of Pillsbury Madison & Sutro LLP

[57] ABSTRACT

A process is described for removing noxious compounds such as hydrocarbons which may or may not contain halogen and/or may or may not be aromatic, from solids (soil), water or gas, according to which process the solid, the water or the gas is treated with a complex of a transition metal and an alkaline polyamine in the presence of a peroxide. The complex is, for example, a complex of iron chloride and 1,4,7-trimethyl-1,4,7-triazonane. The peroxide is preferably electrochemically produced hydrogen peroxide.

18 Claims, No Drawings

PROCESS FOR REMOVING NOXIOUS COMPOUNDS

The invention relates to a process for removing noxious compounds from the natural environment such as water, air or ground from solids, water or gas. In particular, the invention relates to a process for removing substances such as hydrocarbons which may or may not contain other substituents, especially halogens, and/or may or may not be aromatic or heteroaromatic, organic dyes or other organic compounds. Examples thereof are monocyclic aromatic hydrocarbons (ethylbenzene, xylenes and the like), polycyclic aromatic hydrocarbons, halogen-containing compounds (chlorobenzenes, bromobenzenes, polyhalogenated biphenyls, polychlorodibenzodioxins, polychlorodibenzofurans and the like), nitro compounds, lignin, aromatic or heteroaromatic dye compounds containing azo, amino, nitro, halo, and/or sulpho substituents, and other compounds and other hydrocarbons, which may be volatile, such as alkanols. In general, the compounds to be removed contain at least one carbon-hydrogen bond.

The removal of such generally persistent noxious substances according to known methods is complicated and expensive, or else unsatisfactory, which is related, inter alia, to the poor degradability by standard biological systems. *J. Agric. Food Chem.* 41, 308–312 (1993) discloses the breakdown of undesirable organic compounds by means of complexes of iron and gallic acid, picolinic acid or rhodizonic acid. A similar treatment by means of iron complexes of phthalocyanines has been described in *J. Chem. Soc. Chem. Comm.* 1799 (1994).

DE-A-2703267 discloses a process for removing phenols from waste water by treating the waste water with hydrogen peroxide and a complex of iron and EDTA (ethylenediamine-tetraacetic acid) in an amount of 1–2 g complex per 1 of water. The molar ratio of hydrogen peroxide to Fe-EDTA complex is in the order of 3:1 to 70:1, whereas the molar ratio of FE-EDTA complex to phenol is in the order of 1:5 to 3:1. A disadvantage of the known process is that relatively high levels of the Fe-EDTA complex are required.

It has now been found that such persistent noxious compounds can be removed effectively by treating the solid or soil, the water or the gas, respectively, which contain these compounds, with a complex of a transition metal and a polyamine in the presence of a peroxide.

The transition metal in the complex to be employed according to the invention is preferably a metal that is not particularly noxious to living organisms, in particular iron, manganese or cobalt. Most preference is given to iron.

A polyamine, which forms a complex with the transition metal, is understood to refer to compounds which comprise at least two amine nitrogen atoms, separated by at least two carbon atoms. Preferably, the polyamines comprise at least three nitrogen atoms which in each case are separated by two or more, in particular two or three, more in particular two, carbon atoms. The remaining valencies of the nitrogen atoms are preferably bound with small alkyl groups, in particular methyl. It is also possible for the polyamines to have ether or alcohol functions. The polyamines can be linear or cyclic. The polyamines should be alkaline, i.e. should not contain acid functions.

Examples of polyamines which can be employed are tetramethylethylene diamine, pentamethyldiethylene triamine, 1,4-dimethylpiperazine, 1,4,7-trimethyl-1,4,7-triazonane, 1,4,7-trimethyl-1,4,7-triazecane, 1,4,7,10-tetramethyl-1,4,7,10-tetraazacyclododecane, 1,2-bis(4-methyl-1-piperazinyl)ethane, 1,2-bis(4,7-dimethyl-1,4,7-triaxonan-1-yl)ethane, and the corresponding compounds wherein one or more of the said methyl groups have been replaced by, for example, ethyl groups. It is also possible to use porphin and other porphyrins and corresponding macrocyclic polyamine compounds. Preference is given to compounds of the triazonane type and to amines whose remaining valencies are linked to methyl groups.

The counterions required for neutrality of the complexes may be common non-toxic counterions such as oxide, halide, perchlorate, acetyl acetonate, and the like.

The treatment with the transition metal complexes is carried out in the presence of a peroxide. The peroxide may be an organic or inorganic peroxide, peracid, perester, or hydroperoxide, such as methyl hydroperoxide, t-butyl hydroperoxide, or cumyl hydroperoxide. Most preferably, the peroxide is hydrogen peroxide. The concentrations of hydrogen peroxide and complex are chosen as a function of the concentration of noxious substances, the hydrogen peroxide being employed preferably in a molar excess with respect to the compounds to be broken down, and the metal complex being employed in a catalytic amount. The molar ratio between hydrogen peroxide and substances to be broken down can vary depending on the application intended. Said ratio can, for example, be up to 1000:1 and is preferably from 1:1 to 100:1. The molar ratio between metal complex and substances to be broken down can vary from, for example, 1:1000 to 1:10, preferably 1:1000 to 1:20. The rate of the break-down reaction is primarily determined by the amount of complex added. If rapid removal is unnecessary, a low concentration of complex is sufficient, e.g. 0.1–2 mmol/l. The molar ratio between transition metal complex and hydrogen peroxide can vary, as a result, from, for example, 1:10 to 1:100,000 in particular from 1:100 to 1:10,000.

The hydrogen peroxide can be added as such, as an aqueous solution by means of a pump, but it can also be produced in situ by an electrochemical route. In the case of noxious compounds being removed from water, the entire stream or, for example, a side stream of the water stream to be treated, can be passed through an electrochemical cell where hydrogen peroxide is formed, whereafter said stream is passed back to the stream to be treated. Instead of hydrogen peroxide it is also possible, for example, to employ a percarbonate or a perborate.

The temperature with the treatment can vary between 0° and 100° C. The reaction proceeds most efficiently at a temperature of 40°–90° C. The temperature optimum, for most complex systems is around 70° C. The most suitable reaction temperature is chosen depending on the application. Thus it is possible, for purifying ground and surface water, to employ a temperature of 0°–30° C. In the case of process and cooling water use can be made, advantageously, of the elevated temperature, and such streams are therefore preferably not cooled before the treatment according to the invention. The pH can vary over a wide range. Preferably the pH is neutral to slightly alkaline, for example between 6 and 11.

The process according to the invention can be employed for diverse purification processes. An important application is the removal of noxious compounds from water. This may involve, for example, waste water, process water, cooling water and ground water. In the case of waste water it is possible, after the treatment according to the invention, but in particular before the treatment according to the invention, for a further purification step to be carried out. If the waste water, for example, in addition to the persistent compounds also contains readily degradable organic compounds, the treatment according to the invention can be preceded by an aerobic or anaerobic biological purification.

The process according to the invention for treating water steams may comprise dissolving the complex of the transition metal and the polyamine in the water stream, this then being a matter of a homogeneously catalyzed reaction. This embodiment can be used, for example, for treating water streams which can be recirculated, such as process water and cooling water. In other cases it will be preferable to carry out a heterogeneous catalysis, i.e. to immobilize the complex of transition metal and polyamine, so that the complex can readily be separated once more from the water stream and, after optional regeneration, can be reused. Immobilization can be effected by, for example, coupling to granules or other support material which can be separated on the basis of particle size, density, magnetism and the like. Examples of such support material are activated carbon, Perlite®, magnetite and other polymer materials. Another advantageous embodiment of the process according to the invention is also the treatment in columns, the treatment column being packed with a complex of transition metal and polyamine, said complex being chemically or physically bound to a polymer resin. Resins suitable for the packing of such columns and means for coupling the polyamines to such resins are generally known. Said heterogeneous catalysis is suitable, in particular, for the purification of, for example, waste water and ground water, but also of cooling water and process water.

When water is treated in the above-described manner, the organic compounds solubilized by the combination of transition metal/polyamine and hydrogen peroxide can be broken down further with the aid of suitable microorganisms such as those occurring in activated sludge. The microorganisms can be employed, for example, in the form of sludge-on-support. Anaerobic systems can likewise be employed in combination with the treatment according to the invention.

The process according to the invention is also suitable for the treatment of soils of dredgings contaminated with persistent chemicals. Said purification can be carried out either in situ or ex situ. In the case of treatment in situ, a solution of the complex with hydrogen peroxide is passed through the soil or through the material, in such a way that all soil particles come sufficiently into contact with the complex and the hydrogen peroxide. It is also possible to pass the complex through on its own, while hydrogen peroxide is formed electrochemically in situ. Further breakdown is effected, for example, by means of microorganisms which may be present in the soil, or may, if required, be added. It is also possible for the contaminated soil, in situ or after ex situ, to be extracted with a suitable solvent, for example water which may or may not be combined with an auxiliary solvent such as a surfactant, and the extract then to be treated with a complex of transition metal and polyamine and hydrogen peroxide, possibly at the same time as or followed by a treatment with microorganisms.

A variation on the treatment of contaminated soil is the treatment of solid waste. This, according to the invention, can be done in the same manner, for example by a solution of the active compounds being passed through, or by extraction followed by treatment of the extract. Types of solid waste which can be treated in this manner according to the invention are, for example, vegetable waste, fruit waste and garden waste, from which ligneous compounds and other contaminating organic substances can be removed, agricultural waste and industrial waste. As a result of the removal of the ligneous substances, the waste becomes amenable to further solubilization with the aid of microorganisms and/or enzymes or to physicochemical solubilization methods.

The process according to the invention can also be employed for the purification of gases. For this purpose, the gas to be purified is advantageously passed into a scrubber of a known type, wherein the gas, for example in countercurrent, is brought into contact with a wash liquor. A suitable type of gas scrubber is an appliance comprising a trickling bed. The wash liquor is formed by a solution in water of the complex of transition metal and polyamine which is admixed, continuously or at intervals, with hydrogen peroxide. The wash liquor can advantageously be recirculated. The wash liquor may, if required, contain an auxiliary solvent such as a detergent which increases the solubility of the compounds to be removed in the aqueous phase. Suitable solvents can be employed, for example, in a concentration of 5–25 mmol/L. Impurities which can thus be removed from gas streams are, for example, lower alcohols and volatile aromatic compounds such as ethylbenzene and xylenes. Equally, membranes contaminated with organic compounds can be cleansed by means of the process according to the invention.

EXAMLPE I

Various spent textile dye baths, indicated as A, and C, were treated, over a period of 24 hours at 7° and 50° C., with hydrogen peroxide and iron chloride/trimethyltriazonane complex (ratio $H_2O_2$:complex 6000:1). The CODs of the dye baths A, and C were, respectively, 33 g/l, 31 g/l and 31.5 g/l. In each case, diluted samples were used.

FIGS. 1a, b, c depict the absorbances of samples of A, B and C, respectively, over the wavelength region of 400–700 nm at the start (t=O, top line) and after 24 hours (bottom line).

EXAMPLE II

The spent textile dye baths A and B according to Example 1 were likewise treated, over a period of 24 hours and at 50° C., with hydrogen peroxide and iron chloride/ trimethyltriazonane complex (6000:1), but at a pH of 9.5. For purposes of comparison, the treatment was carried out with hydrogen peroxide, but without complex.

FIG. 2 depicts the absorbances of samples A (successively without and with complex) and B (the same) at a wavelength of 497 nm at t=O, t=2, t=8 and t=24 (hours).

EXAMPLE III

A standard mixture of 16 polycyclic aromatic hydrocarbons (16 EPA PAHs) was treated over a period of 24 hours at pH 9.5 and 50° C., with hydrogen peroxide and iron chloride/trimethyltriazonane complex (the ration $H_2O_2$:PAH:complex was 100,000:300:1). FIG. 3 depicts the concentration of PAHs at the start (t=O, left-hand columns) and after 24 hours (right-hand columns) in µg/ml. The PAHs were measured by means of HPLC and fluorescence detector. The first columns relate to the total mixture, the following columns relate to, respectively, benzo[a]pyrene (b [a]p), pyrene (pyr), fluoranchene (flu) and benzo[a]anthracene (b [a]a).

We claim:

1. A process for removing noxious organic compounds from solids, water or gas containing at least one contaminant of the class of hydrocarbons, halogen-substituted hydrocarbons, nitro-substituted hydrocarbons and organic dyes, comprising the step of:

treating the solid, the water or the gas with a complex of a transition metal, a peroxide and an alkaline polyamine which is substantially free from acid functional groups.

2. Process according to claim 1, wherein the transition metal is selected from the group consisting of iron, manganese and cobalt.

3. Process according to claim 1, wherein a molar ratio of transition metal to peroxide of 1:100–1:10,000 is employed.

4. Process according to claim 1, wherein a concentration of transition metal of 0.1–2 mmol/l is used.

5. Process according to claim 1, wherein the peroxide is selected from the group consisting of organic or inorganic peroxides, peracids, peresters and hydroperoxides.

6. Process according to claim 5, wherein the peroxide is hydrogen peroxide.

7. Process according to claim 1, wherein said alkaline polyamine has at least three amine groups each separated by at least two carbon atoms.

8. Process according to claim 1, wherein said noxious organic compounds are removed from water and the complex is immobilized on a support.

9. Process according to claim 1, wherein said noxious organic compounds are removed from a gas and the complex is contained in a recirculated wash liquor.

10. Process according to claim 1, wherein said noxious organic compounds are removed from water or from soil and the water or the soil is also treated with microorganisms.

11. Process according to claim 1, wherein said noxious organic compound contaminants include at least one of hydrocarbons, halogen-substituted hydrocarbons, nitro-substituted hydrocarbons and organic dyes.

12. A process according to claim 1, wherein the pH is from about 6 to about 11.

13. A process according to claim 1, wherein the water to be treated is recirculated process water.

14. A process according to claim 2, wherein the transition metal is iron.

15. A process according to claim 6, wherein the hydrogen peroxide is prepared in situ electrochemically.

16. A process according to claim 7, wherein the alkaline polyamine is selected from the group consisting of tetramethylethylene diamine, pentamethyldiethylene triamine, 1,4-dimethylpiperazine, 1,4,7-trimethyl-1,4,7-triazonane, 1,4,7-trimethyl-1,4,7-triazecane, 1,4,7,10-tetramethyl-1,4,7,10-tetraazacyclododecane, 1,2-bis(4-methyl-1-piperazinyl) ethane, and 1,2-bis(4,7-dimethyl-1,4,7-triazonan-1yl) ethane.

17. A process according to claim 16, wherein the alkaline polyamine is a 1,4,7-triazonane.

18. A process for removing noxious organic compounds from solids, water or gas containing at least one contaminant of the class of hydrocarbons, halogen-substituted hydrocarbons, nitro-substituted hydrocarbons and organic dyes, comprising the step of:

treating the solid, the water or the gas with a complex of a transition metal, a peroxide and a 1,4,7-triazonane.

* * * * *